Dec. 25, 1928.

H. O. McMILLAN

COLUMN CLAMP WITH CASTINGS

Re. 17,170

Original Filed June 1, 1926

INVENTOR
HOWARD O. McMILLAN
BY HIS ATTORNEYS
Williamson Kerr & Williamson

Reissued Dec. 25, 1928. Re. 17,170

UNITED STATES PATENT OFFICE.

HOWARD O. McMILLAN, OF MINNEAPOLIS, MINNESOTA.

COLUMN CLAMP WITH CASTINGS.

Original No. 1,636,143, dated July 19, 1927, Serial No. 112,752, filed June 1, 1926. Application for reissue filed September 24, 1928. Serial No. 308,105.

This invention relates to a clamp, and particularly to such a clamp as used for clamping concrete forms for concrete columns. As is well known to those skilled in the art, in the formation of such columns, a form is made usually of boards which must be firmly held in assembled position and a series of clamps are used, embracing said form for drawing and holding it in the proper position until after the concrete is poured and has set.

It is an object of this invention, therefore, to provide a simple and efficient clamp for clamping a concrete column form, comprising few parts, and one which can be easily and quickly operated and which will have a continuous take-up.

It is also an object of this invention to provide such a clamp comprising a casting adapted to be disposed at the corner of the form and out of contact therewith, having substantially flat arms with their flat sides disposed respectively in horizontal planes extending along the sides of the form and means cooperating with said arms and disposed along the sides of the form for tightening the clamp.

It is still further an object of the invention to provide such a clamp comprising a corner member preferably made as a casting, having a corner portion from which arms extend at right angles along the sides of the form, which arms are adapted to embrace the ends of a pair of bars pivoted to other bars at the adjacent corners of the form, a pair of bars overlapping in the corner portion of said casting, said arms and bars having a plurality of longitudinally extending elongated slots which are spaced different distances in said arms and bars, together with wedge means adapted to extend through said arms and bars, to effect a continuous take-up between said casting and bars, to tighten and hold said clamp.

These and other objects and advantages of the invention will be fully set forth in the following description made in connection with the accompanying drawings, in which like reference characters refer to similar parts throughout the several views and in which:—

The present clamp is in some respects an improvement over the clamp disclosed and claimed in applicant's prior Patent No. 1,539,053, granted May 6, 1925. In the clamp of said patent there are four pairs of hinged bars. Some contractors desire to have as few pieces in the clamp as possible, and the present clamp is designed to have a fewer number of parts.

Figure 1:
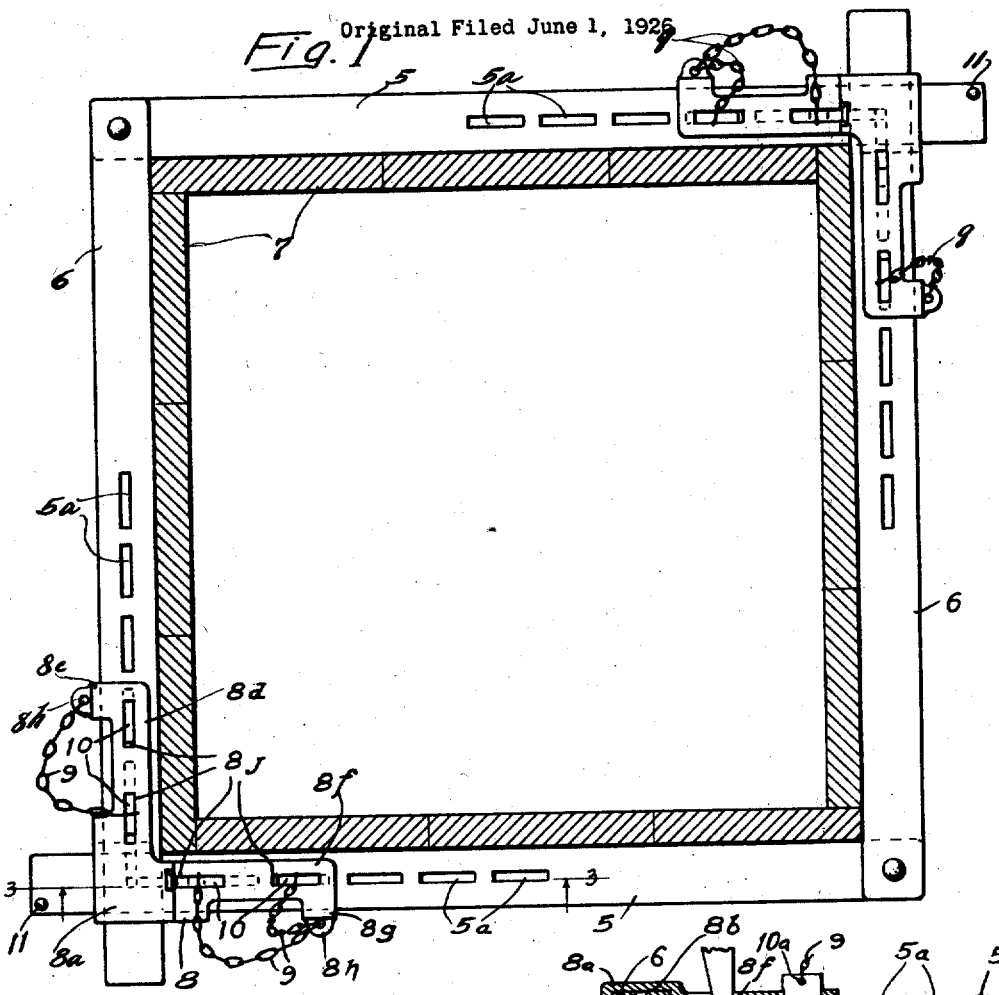
Fig. 1 is a plan view of the device as applied to a column form, with the form shown in horizontal section.
Figure 3:
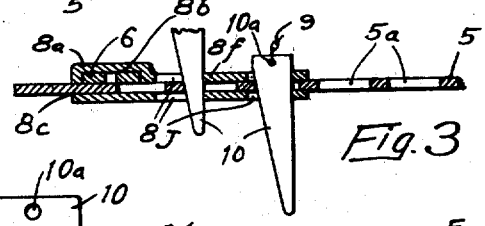
Fig. 3 is a vertical section taken on the line 3—3 of Fig. 1, as indicated by the arrow.
Figure 2:
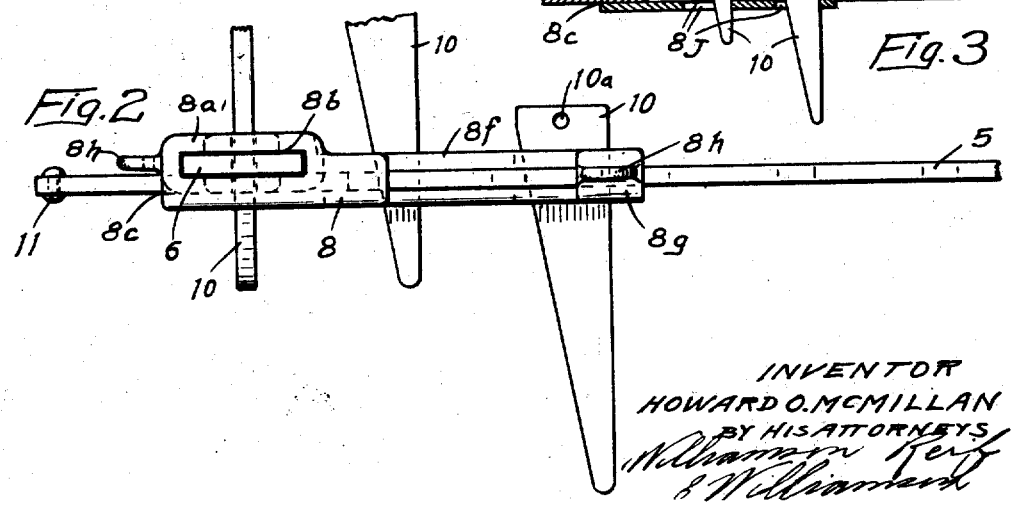
Fig. 2 is a view in side elevation as seen from the bottom of Fig. 1.

Referring to the drawings, a clamp is shown comprising bars 5 and 6 hinged together at one end to form two pairs. While the bars 5 and 6 may be variously formed, they are preferably, and in the embodiment of the invention illustrated, formed as plain flat bars rectangular in plan and cross section, having their pivoted ends overlapping. The bars 5 and 6 of each pair extend along the adjacent sides of the form, which form is shown in Fig. 1 as 7, with one edge of said bars is contact with the sides of the form. Each of the bars 5 and 6 has a plurality of spaced alined elongated slots $5^a$ extending therethrough, which in the embodiment of the invention illustrated are shown as two in number. The free ends of the bars of the respective pairs overlap at two corners of the form and said overlapping bars pass through a member 8 preferably formed as a casting. The member 8 has a corner portion $8^a$ from which extend at right angles to each other the arms $8^d$ and $8^f$, which arms are comparatively flat and with their flat sides disposed substantially in a horizontal plane. Each of the arms $8^d$ and $8^f$ has a slot extending longitudinally therethrough said slots being designated $8^b$ and $8^c$ respectively. The slots $8^b$ and $8^c$ are disposed centrally of the arms $8^d$ and $8^f$ in a vertical direction and extend longitudinally of the said arms, said slots being open at at the inner sides of said arms, but being wholly or partially closed at their outer sides by the portions $8^e$ and $8^g$ respectively. The slots $8^b$ and $8^c$ in effect merge at the corner portion $8^a$ of the casting 8, thus forming a chamber in said casting at this corner portion. This chamber or recess in the corner portion $8^a$, however, does not extend along the inner longitudinal sides of the arms $8^d$ or $8^f$, but is confined to the corner portion $8^a$ of the member 8 where the bars 5 and 6 overlap. It will also be noted that the arms $8^d$ and $8^f$ are in slightly different vertical planes. The arms $8^d$ and $8^f$ are each provided adjacent the outer end and side with an apertured lug $8^h$. Chains 9 are each connected to the lugs $8^h$ and are each connected at its other end with a wedge member 10, two of which wedges are provided for each arm and which wedges have a hole $10^a$ therein in which one end of the chains 9 are respectively fastened. Each arm $8^d$ and $8^f$ has a plurality of elongated slots $8^j$ extending therethrough, which slots are transversely alined with the slots $5^a$ in the bars 5 and 6, but are spaced a different distance than the slots in said bars. Each bar 5 has a rivet 11 secured adjacent its free end to prevent the member 8 from sliding therefrom.

In operation the members 8 will always be carried on the bars 5. When the device is to be placed about a column, the ends of bars 6 will be slid into the slots $8^b$ so that the device will assume the position shown in Fig. 1. The sides of the bars 5 and 6 will thus be brought against the sides of the form and one of the slots $5^a$ will partially aline with one of the slots $8^j$. The wedge 10 is now inserted through the partially alined slots $5^a$ and $8^j$, in each of the arms $8^d$ and $8^f$, and driven downwardly therein. This wedge will bear against one end of the slot $8^f$ and will tend to draw the bars 5 and 6 through the member 8. The bars will thus be tightly drawn about the form and securely held against the same. If one of the wedges 10 is driven down until the slot $5^a$ substantially alines longitudinally with the slot $8^j$, another wedge can be placed through the other slot $8^j$ which will then be only partially alined with one of the slots $5^a$ and a continuous or step by step tightening process or take-up can thus be performed. It will be noted that the wedges and thus the drawing effect takes place quite close to the form 7 and that this effect is inward of the corners or along the sides of the form and not beyond the member 8. It will also be noted that the member 8 does not contact with the form but the wedges react against the member 8, which member thus forms the base of reaction for tightening the bars 5 and 6 and the clamp.

The described structure also acts to square up the form when the clamp is brought to tightened position. The slots $8^j$ are longitudinally alined with their respective arms $8^d$ and $8^f$ and the slots in these arms thus extend at right angles to each other. The slots $5^a$ in the bars 5 and 6 also extend longitudinally of said bars. The wedges 10 are of substantially the same width as the slots $8^j$ and $5^a$ and when these wedges are driven through the slots $8^j$ and through the slots $5^a$, these slots are brought into alinement so that the center line of slots $5^a$ coincides with the center line of slots $8^j$. As the slots $8^j$ in the arms $8^d$ and $8^f$ are at right angles, the overlapping bars 5 and 6 are thus brought to a right angle position and there can be no skewing of the form when it is tightened. This skewing of the form has been a great objection to previous column clamps which had no means for insuring that the arms would be brought to tightened position at right angles to each other. With aplicant's clamp, the bars 5 and 6 must be at right angles when the clamp is in tightened position. The chains 9 are provided so that the wedges are always present and will not become lost when the apparatus is stored or transported from one job to another.

From the above description it is seen that applicant has provided a very simple and efficient column plant, one comprising few parts and yet one that can be very easily and quickly applied to the form and clamped and held in position thereon. The clamp and the bars thereof can be tightened by a continuous or progressive take-up movement by means of the wedges used, and the clamp can be held in any position to which it may be taken up. The wedges are very securely held in the position to which they are driven by friction and the form is thus securely held in its clamping position. The arms of the casting 8 are disposed, and the clamping action takes place, along the sides of the form and there are no parts or tightening devices projecting beyond the corners of the form.

Also, as above stated, the form is brought into a true square or other angular position by means of the castings and bars when the wedges are driven therethrough. Also, as above stated, the casting through which the bars extend does not engage the form. The clamp, when assembled, comprises only two parts or groups, as the members 8 are carried on the bars 5 and the wedges are carried by the members 8. The clamp can thus be stored and transported with no danger of the parts becoming lost, and there are fewer parts to handle when the device is to be assembled in operative position.

The device has been amply demonstrated in actual practice and found to be very convenient, successful and efficient. It will, of course, be understood that various changes may be made in the form, details, arrangement and proportions of the parts, without departing from the scope of applicant's invention, which generally stated, consists in a device capable of carrying out the objects above set forth, in the novel parts and combinations of parts disclosed and defined in the appended claims.

What is claimed is:

1. A clamp for a column form comprising two pairs of bars, the bars of each pair being pivoted together at one end, the pivoted ends of said bars being adapted to be disposed at opposite corners of said form with the bars extending along adjacent sides thereof, one bar of each pair overlapping a bar of the other pair at the other corners of said form, a member at each of said last mentioned corner having arms extending along the sides of the form embracing said overlapped bars and means acting on said arms and bars and disposed along the sides of said form for progressively drawing said bars toward said member and holding the same in clamping position.

2. A clamp for a column form comprising two pairs of bars, the bars of each pair being pivoted together at one end, the pivoted ends of said bars being adapted to be disposed at opposite corners of said form with the bars extending along adjacent sides thereof, one bar of each pair overlapping a bar of the other pair at the other corners of said form, said bars having a series of spaced slots extending therethrough, a member at each of said last mentioned corners having arms extending along the sides of said form, said arms having a plurality of slots extending therethrough transversely alined with the slots in said bars but spaced a different distance from the slots in said bars and wedge members extending through said arms and bars for drawing said bars into said member and holding the same in clamping position.

3. A clamp for a column form comprising bars extending along the sides of said form and having free ends overlapping at one corner thereof, a member at said corner embracing said overlapping ends and having portions extending along the sides of said form and means co-operating with said portions and bars and disposed along the sides of said form between the corners thereof for drawing said bars into said member.

4. A clamp for a column form comprising bars extending along the sides of said form and having free ends overlapping at one corner thereof, a member at said corner embracing said overlapping ends and having portions disposed at the angle between adjacent sides of the form extending along the sides of said form, said portions having means extending longitudinally thereof, said bars also having means extending longitudinally thereof, and members co-operating with said portions and bars and said means for drawing said bars into said first mentioned member and positioning said bars at the same angle to each other, at the sides of the form.

5. A clamp for a column form comprising bars extending along the sides of said form and having free ends overlapping at one corner thereof, a member at said corner embracing said overlapping ends and having portions disposed at right angles extending along the sides of said form, said portions having means extending longitudinally thereof, said bars also having means extending longitudinally thereof, and members extending through said portions and bars and said means, for drawing said bars into said first mentioned member and positioning said bars at right angles to each other.

6. A clamp for a column form comprising bars extending along the sides of said form, having free ends at one corner thereof extending one above the other, a member at said corner embracing said ends and having portions extending along the sides of said form and means extending through said portions and bars for drawing said bars into said member with a continuous take-up action.

7. A clamp for a column form comprising bars extending along the sides of said form, having free ends at one corner thereof extending one above the other, a member at said corner embracing said ends and having portions extending along the sides of said form, said portions and bars having spaced elongated slots therein, the slots in said bars being spaced a different distance from the slots in said portions whereby the slots in said portions and bars will at all times be out of register, and wedges adapted to extend through said slots in said portions and bars for drawing said bars into said member.

8. A clamp for a column form comprising bars extending along the sides of said form and having free ends overlapping at one corner thereof, a member at said corner embracing said overlapping ends and having portions extending along the sides of said form and means disposed along the sides of said form and engaging said member and bars for continuously drawing said bars into said member and holding the same in position.

9. A clamp for a column form comprising two pairs of bars, the bars of each pair being pivoted together at one end, the pivoted ends of said bars being adapted to be disposed at opposite corners of said form with the bars extending along adjacent sides thereof, one bar of each pair overlapping a bar of the other pair at the other corners of said form, said bars having a series of spaced openings therethrough, a member at each of said last mentioned corners embracing said overlapped bars and having portions extending along the sides of said form, said portions having a plurality of openings therethrough, transversely alined with, but definitely spaced from the openings in said bars, and wedge members disposed at the sides of said form adapted to pass through partially alined openings in said portions and bars, to draw said bars into said member and hold the same in clamping position.

10. A clamp for a column form comprising two pairs of bars, the bars of each pair being pivoted together at one end, the pivoted ends of said bars being adapted to be disposed at opposite corners of said form with the bars extending along adjacent sides thereof, one bar of each pair overlapping a bar of the other pair at the other corners of said form, means at each of said last mentioned corners engaging said overlapped bars and including arms extending along the sides of the form, each embracing one of said bars, and means disposed at the sides of said form acting on said arms and bars and disposed along the sides of said form for progressively drawing said bars toward said means and holding the same in clamping position.

11. A clamp for a column form comprising two pairs of bars, the bars of each pair being pivoted together at one end, the pivoted ends of said bars being adapted to be disposed at opposite corners of said form with the bars extending along adjacent sides thereof, one bar of each pair overlapping a bar of the other pair at the other corners of said form, said bars having a series of spaced openings therethrough, means at each of said last mentioned corners including members embracing said overlapped bars and extending along the sides of said form, said members having a plurality of openings therethrough transversely alined with, but differently spaced from the openings in said bars, and wedge members adapted to be disposed at the sides of said form and to pass through partially alined openings in said member and bars to draw said bars into said members and hold the same in clamping position.

12. A clamp for a column form comprising bars extending along the sides of said form and having free ends overlapping at one corner thereof, means at said corner embracing said overlapping ends and having portions extending along the sides of said form, and means co-operating with said portions and bars and disposed along the sides of said form between the corners thereof for drawing said bars toward said means.

13. A clamp for a column form comprising bars adapted to be disposed along the sides of the form and project past the corners thereof, a member carried by one of said bars at the corner of said form having a portion disposed along the side of said form adjacent the corner thereof held in alinement with said bar and having another portion extending substantially at right angles to said first mentioned portion, said latter portion having a plurality of slots therethrough and receiving the end of the other bar adjacent said corner, said bars having slots therethrough spaced differently from the slots in said latter portion and wedge means adapted to be driven through the slots in said latter portion and bar received therein to cause relative movement between said bar and portion to tighten said clamp, said slots being so spaced in said portion and bar that a continuous take-up may be secured on said clamp.

14. A clamp for a column form comprising bars adapted to be disposed along the sides of the form and project past the corners thereof, a member disposed at the corner of said form carried by one of said bars so as to prevent any twisting movement relative thereto, said member having another portion projecting past the corner of said form rigid with and disposed at right angles to said first mentioned portion and receiving the other bar at said corner, said last mentioned portion having a plurality of slots extending therethrough, said bars having a single row of alined slots therein spaced differently from the slots in said last mentioned portion, and wedge means adapted to pass through the slots in said last mentioned portion and bar therein to cause relative movement between said bar and portion and tighten said clamp, said slots in said bar and portion being so spaced that a continuous take-up in said clamp may be secured.

15. A clamp for concrete column forms having clamping bars overlapped and crossed at a corner of a mold, and angle-pieces having arms connected together in different planes, one of said arms being carried by one of said bars inside of their crossings and the other arm being fitted to the other bar, said latter arm and the bar therein being provided with slots therethrough, the slots being spaced differently in said arm and bar, and a wedge adapted to pass through the slots in said arm and bar therein to cause relative movement of said arm and bar, said slots being so spaced in said arm and bar that a continuous take-up in said clamp may be secured.

16. A clamp for a concrete column form comprising bars adapted to extend about said form and project at the corners thereof, a casting disposed adjacent the corner of said form having portions disposed substantially at right angles and directed inwardly along the sides of said form, said portions being alined with said bars and one of them receiving one of said bars and having spaced slots therethrough, said bars also having spaced slots therethrough and wedge means adapted to pass through said slots in said last mentioned portion and through the slots in the bar therein, to relatively move said bar and portion, the other bar forming a base of resistance for said movement, said slots in said latter portion and bar being spaced less than half the distance in one than the other.

In testimony whereof I affix my signature.

HOWARD O. McMILLAN.